Dec. 27, 1966 R. F. COOK 3,295,018
ELECTRICAL APPARATUS
Filed May 21, 1963 2 Sheets-Sheet 1
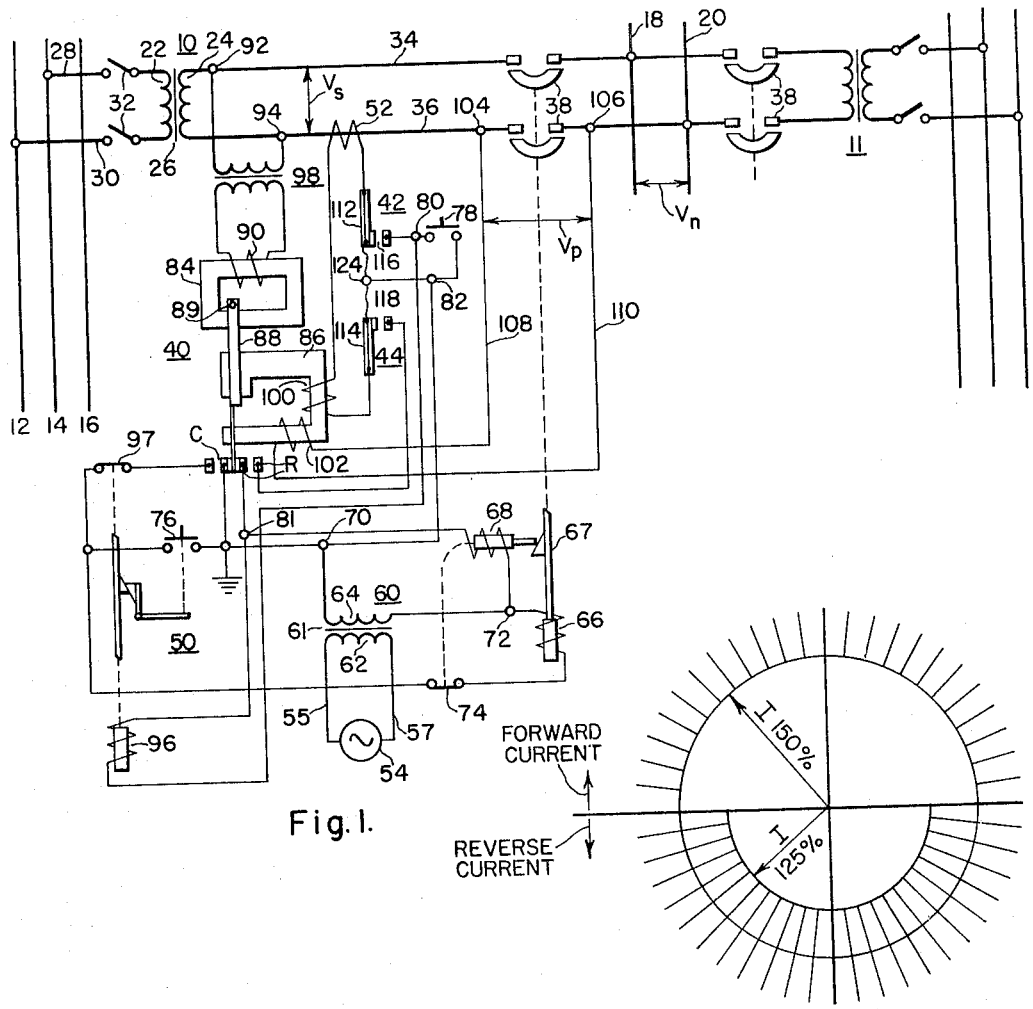
Fig. 1.
BREAKER OPENING CHARACTERISTICS
Fig. 3.
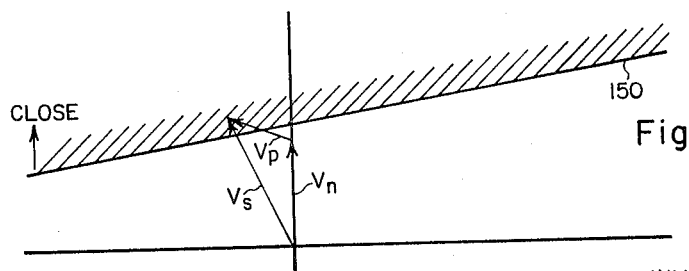
BREAKER CLOSING CHARACTERISTICS
Fig. 4.
WITNESSES
Theodore F. Wrobel
Donald R. Lackey
INVENTOR
Richard F. Cook
BY F. E. Browder
ATTORNEY

# United States Patent Office 3,295,018
Patented Dec. 27, 1966

3,295,018
ELECTRICAL APPARATUS
Richard F. Cook, Penn Hills Township, Allegheny County, Pa., assignor to Westinghouse Electric Corporation, East Pittsburgh, Pa., a corporation of Pennsylvania
Filed May 21, 1963, Ser. No. 281,922
11 Claims. (Cl. 317—23)

This invention relates in general to electrical apparatus and more particularly to protective and control circuits for electrical inductive apparatus.

With the advent of large suburban shopping centers and other concentrated loads on the fringe areas of power company distribution systems, two or more radial feeder lines, or lines having a single simultaneous path of power flow to the load, may have transformers with the secondary windings connected in parallel and feeding a common electrical circuit to serve the concentrated load. Thus, a simple network system, or circuit that has more than one simultaneous path to the load, is created with respect to the load served by the parallel secondary windings of these transformers. Network protectors commonly used in pure network systems have disadvantages when applied to protect the transformers with the paralleled secondary windings in such a combination radial-network system. For example, the sensitive reverse current tripping characteristics of the conventional network protector is not only unnecessary, but may cause unnecessary tripping of the secondary breaker of the transformer due to the reclosers on the radial line, which are not used on pure network systems. Further, it is not necessary to have sensitive reverse current tripping, as any reverse current flow would be to supply loads on the radial portions of a feeder, and the reverse current flow would be of sufficient magnitude that a non-sensitive device would adequately give the desired indication. Even if there were no connected loads on the radial portions of the feeder lines, sensitive reverse current tripping would still not be required as no damage to the equipment would be caused. Further, conventional network protectors have no provision for tripping the transformer secondary breakers on forward current overloads, relying on other circuit functions to isolate the faulted section of the network.

In copending application, Serial No. 281,923, filed May 21, 1963, by Richard F. Cook et al. and assigned to the same assignee as the present application, a protective and control system for electrical inductive apparatus is disclosed which provides a new and improved forward and reverse current tripping scheme for circuit interrupting devices. Reclosing of the circuit interrupting device may be accomplished by time delay reclosing means, which may be a part of the circuit interrupting device, or any other suitable means. The present application provides a new and improved forward and reverse current tripping scheme for circuit interrupting devices and a new and improved reclosing scheme for reclosing the circuit interrupting device when the circuit conditions which caused the tripping are no longer present.

The term reverse current, as used throughout this specification, is used in the conventional manner and means that current associated with electric energy flowing through the transformer from the secondary or low voltage windings to the primary or high voltage windings. Conversely, forward current means that current associated with electric energy flowing through the transformer from the primary or high voltage windings to the secondary or low voltage windings.

Therefore, it is desirable to provide an uncomplicated and inexpensive protective and control apparatus that will provide insensitive reverse current tripping of the secondary breaker as well as forward current tripping on overloads. Further, the protective and control system should have the feature of the conventional network protector in being able to automatically reclose the transformer secondary breaker after a reverse current trip, when the voltages of the system are such that forward current will again flow.

Accordingly, it is the general object of this invention to provide an improved control and protective system for inductive apparatus.

It is a more particular object of this invention to provide an improved control and protective system for transformers that will provide insensitive reverse current tripping of the transformer secondary breaker and forward current tripping of the transformer secondary breaker on overloads.

Another object of this invention is to provide a new and improved control and protective system for electrical transformers that will reclose the transformer secondary breaker after a trip due to reverse current flow, when the system voltages are such as to again cause forward current to flow.

Briefly, the present invention accomplishes the above cited objects by utilizing an inexpensive power relay with two sets of contacts along with forward and reverse current bimetal actuated contacts and associated circuitry. More specifically, when the current, sensed by a current transformer disposed in an inductive relationship with the transformer secondary line, is in the proper or forward direction flowing to the load, the first set of relay contacts in the power relay in the reverse current bimetal circuit are open and the secondary circuit breaker will only trip when the line current exceeds the setting on the forward current bimetal element. A trip of the secondary circuit breaker due to a forward current overload deactivates the automatic reclosing feature associated with a trip of the circuit breaker due to reverse current. The automatic reclosing feature is reset when the "closing" push-button is depressed. When the current, on the other hand, is in the reverse direction, the first set of contacts are closed by action of the power relay, allowing the secondary circuit breaker to trip when the line current exceeds the setting on the reverse current bimetal element. When the secondary breaker has tripped due to excessive reverse current, the secondary circuit breaker will be automatically reclosed by the second set of relay contacts when the voltages on each side of the secondary circuit breaker contacts are such as to again allow current to flow in a forward direction.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGURE 1 is a schematic diagram of circuits and apparatus illustrating an embodiment of the invention when used in connection with single phase inductive apparatus;

FIGS. 3A and 3B are diagrammatic representations showing the opening and closing characteristics, respectively, of the transformer secondary breaker when using a protective and control system embodying the teachings of this invention.

Figure 2:
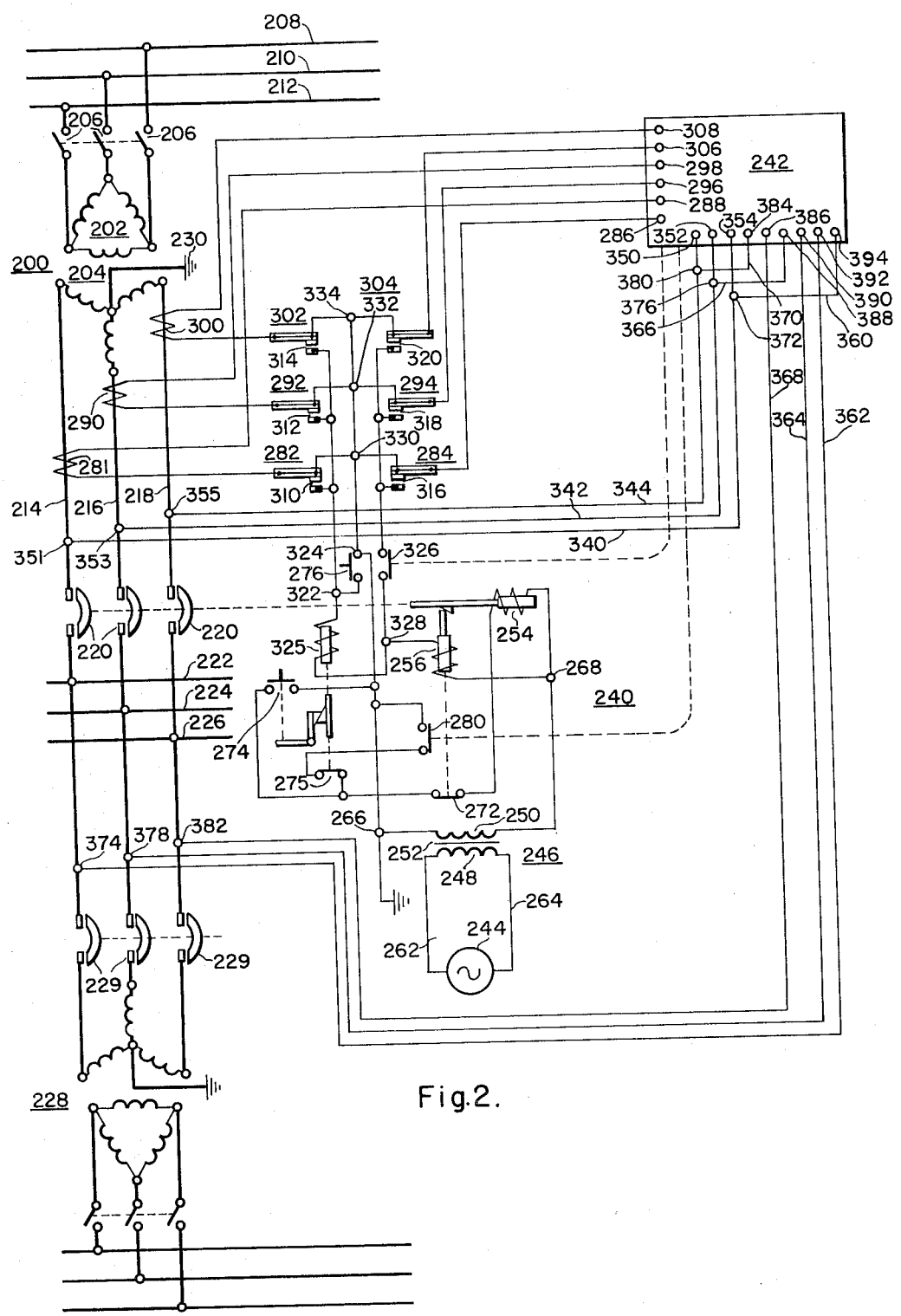
FIG. 2 is a schematic diagram of circuits and apparatus illustrating an embodiment of the invention when used in connection with three phase inductive apparatus.

Referring now to the drawings and FIG. 1 in particular, there is illustrated a single phase distribution transformer 10 connected, in this instance, to conductors 12 and 14 of primary feeder conductors 12, 14 and 16, and to secondary or load conductors 18 and 20. More specifically, transformer 10 includes primary or high voltage winding 22 and secondary or low voltage winding 24 disposed in an inductive relationship with magnetic core 26. Primary winding 22 of transformer 10 is connected to primary feeder conductors 12 and 14 through conductors 28 and 30, with switch 32 serving to make and break the connection of transformer 10 to said primary conductors. Secondary winding 24 of transformer 10 is connected to the load circuit or conductors 18 and 20 through lines 34 and 36. Secondary circuit breaker 38, which may be electrically operated, serves to make and break the connection of transformer 10 to the secondary or load conductors 18 and 20.

Primary conductors 12, 14 and 16 may be part of a three phase distribution system serving radial loads, and secondary conductors 18 and 20 may be part of a single phase distribution system to which one or more additional transformers, such as transformer 11, may be connected, with said additional transformers also having primary feeders which may serve radial loads.

In order to protect and control the operation of transformer 10, a control circuit 50, power relay 40, current transformer 52 and bimetal elements 42 and 44 are provided.

In general, control circuit 50 includes the necessary apparatus and circuitry for controlling the operation of electrically operated circuit breaker 38. In order to obtain the necessary control voltage for the operation of said breaker, a source of electrical potential 54 may be connected to control transformer 60, which includes primary and secondary windings 62 and 64 disposed in an inductive relationship with magnetic core 61. More specifically, potential source 54 is connected to primary winding 62 of transformer 60 through lines 55 and 57. The secondary winding 64 of transformer 60 is connected to terminals 70 and 72 and provides the proper control voltage for the operation of closing and tripping the circuit breaker solenoid coils 66 and 68, respectively.

The closing solenoid coil 66 is connected across terminals 70 and 72, and thus across the control voltage, through normally closed trip-free contacts 74 and closing push-button 76. A normally open contact C, which is responsive to power relay 40 is connected serially with contacts 97, and this series circuit is connected in a parallel circuit relationship with closing push-button 76. As will be fully explained hereinafter, contacts 97 are closed when push-button 76 is manually depressed and contacts 97 are opened when circuit breaker 38 is tripped due to an overload due to forward current or due to the trip bush-button 78 being actuated.

The tripping solenoid coil 68 is connected across terminals 70 and 72, and thus the control voltage, through solenoid coil 96 and trip reset push-button 78. The function of solenoid coil 96 will be explained hereinafter. Terminals 80 and 82, on each side of the trip reset push-button 78, are connected in circuit relation with the bimetal elements 42 and 44 and contacts R and C, which will be described in detail hereinafter.

The power relay 40 may be of the modified directional inductor loop type, as shown in FIG. 1, or a watt transducer, Hall generator, or any other relay device having a set of contacts that will close when reverse current, or current away from the load of the associated transformer flows in the power circuit, and a set of contacts that will close after the circuit breaker 38 has tripped, when the voltage across the contacts of circuit breaker 38 is such that forward current will flow in the power circuit, if the breaker contacts are closed. The relay 40 does not have to be highly sensitive, as any reverse current flow will be of load current magnitude.

The modified directional inductor loop relay includes magnetic cores 84 and 86, loop 88, and two pairs of contacts C and R. In order to make magnetic core 84 responsive to the secondary voltage of transformer 10, winding 90 is disposed in an inductive relationship with a leg of core 84, either directly or through a potential transformer 98, and connected across secondary winding 24 of transformer 10 at terminals 92 and 94. In order to make magnetic core 86 responsive to the secondary load current of transformer 10, winding 100 is disposed in an inductive relationship with a leg of said magnetic core and connected in a series circuit relationship with bimetal elements 42 and 44 and current transformer 52. Current transformer 52 is disposed in an inductive relationship with, in this instance, line 36 of the secondary circuit of transformer 10. In order to make magnetic core 86 responsive to the voltage across the contacts of the secondary circuit breaker 38 when said breaker contacts are open, coil 102 is disposed in an inductive relationship with another leg of said magnetic core and connected across circuit breaker 38 at terminals 104 and 106 through lines 108 and 110. Current induced in loop 88 by transformer action from core 84 and coil 90 reacts with the flux crossing the gap of core 86 to produce a torque and cause loop 88 to move or pivot about point 89. Movement of loop 88 causes contacts C and R to open or close, and contacts C and R are used in turn to control the operation of the secondary circuit breaker 38 as will hereinafter be described.

Bimetal elements 42 and 44 include current carrying members 112 and 114, respectively, and each have a set of contacts 116 and 118 respectively. The current carrying members 112 and 114 of bimetal elements 42 and 44, respectively, are connected in a series circuit relationship with current transformer 52 and winding 100. The stationary portion of contact 116 of bimetal element 42 is connected to terminal 80 of the control circuit 50 and the stationary portion of contact 118 is connected through contact R of relay 40 to terminal 81 and through solenoid coil 96 to terminal 80. Terminal 82 is connected to terminal 124 located between the bimetal elements 42 and 44.

In the operation of the apparatus and circuitry shown in FIG. 1, switch 32 is closed, applying voltage to primary winding 22 of transformer 10. Secondary circuit breaker 38 is closed by momentraily depressing push-button 76, thus applying voltage to lines 18 and 20. Contacts 97 are closed when push-button 76 is depressed, and they remain closed even though push-button 76 returns to its normally open position, due to a mechanical linkage which is well known in the art. Closing push-button 76 completes the circuit from the secondary winding 64 of control transformer 60, through closing solenoid coil 66, causing the breaker contacts of circuit breaker 38 to close and to remain closed even though push-button 76 returns to its normally open position, due to a mechanical linkage 67, which is well known in the art. Bimetal element 42 is set to close its contacts 116 at the maximum allowable value of forward overload current, and bimetal element 44 is set to close its contacts 118 at the maximum allowable value of reverse current. We shall assume for purposes of explanation that bimetal 42 is set to close its contacts 116 at 150% of rated current and bimetal 44 is set to close its contacts 118 at 125% of rated current.

For the first example, assume that forward current increases above the rated transformer current. Bimetal 44 will first cause its contacts 118 to close, as it is set to close at a lower current than bimetal 42. However, the closing of contacts 118 has no effect on the operation of the circuit, unless contact R of relay 40 is closed. Since contact R closes only on reverse current flow, it will be open under the circumstances of this example. Therefore, the forward current increases until it reaches a magnitude of 150% of the rated transformer current, at which time its contacts 116 close. The closing of contacts 116 allows control voltage to be applied to the tripping solenoid coil 68, causing secondary circuit breaker 38 to open. When contacts 116 of bimetal element 42 close, the circuit through said tripping solenoid is completed from terminal 70 of secondary winding 64 of control transformer 60 to terminal 82, to terminal 124, through contacts 116 of bimetal element 42 to terminal 80, through coil 96 to terminal 81 and through tripping coil 68 back to the other end of secondary winding 64 at terminal 72. Therefore, the circuit shown in FIG. 1 will protect transformer 10 in the event of an overload of forward current. As pointed out above, solenoid coil 96 is also energized when contact 116 closes. A mechanical linkage between solenoid coil 96 and contact 97 causes contact 97 to open and prevents the reclosing of circuit breaker 38 by closing of contact C by operation of relay 40. Contact 97 remains open until reclosed when push-button 76 is manually depressed. It should be noted that coil 96 is also energized when circuit breaker 38 is tripped by trip push-button 78. Thus, when circuit breaker 38 is tripped due to operation of bimetal 42 or strip push-button 78, the circuit breaker cannot be reclosed automatically by relay 40.

For the second example, assume that instead of current flowing in a forward direction from transformer 10 towards conductors 18 and 20, a condition occurs in primary feeder circuits 12 and 14 that causes transformer 11 to feed energy back through transformer 10 to pick up radial loads served by primary feeders 12 and 14. Reverse current, is therefore flowing through transformer 10, and the loop 88 of relay 40 will move to close contact R. Relay 40 does not have to be highly sensitive, as it is not necessary to cause tripping of breaker 38 on very low values of reverse current as it is in a system that is completely of the network type. When the reverse current reaches 125% of the transformer rated current, contacts 118 of bimetal 44 will close, and since contact R has already closed as previously mentioned, a circuit is completed from terminal 70 of secondary winding 64 to terminal 82, to terminal 124, through contacts 118 of bimetal element 44, through contact R of relay 40, through tripping coil 68 and back to winding 64 at terminal 72. Thus, breaker 38 is tripped when the preset value of reverse current has been reached.

For the third example, assume that the condition in the primary feeder circuits 12 and 14 which caused reverse current in transformer 10 has been corrected and the voltage across the contacts of circuit breaker 38 is again such that energy will flow from the transformer 10 to conductors 18 and 20. Relay 40, in response to winding 102, will cause contact C to close. Since contact 97 was closed when push-button 76 was actuated to close circuit breaker 38, the closing of contact C bridges the open push-button 76 and completes the circuit from the secondary winding 64 of control transformer 60 through the closing coil 66 of circuit breaker 38, thus restoring transformer 10 to service automatically when circuit conditions are proper. As soon as circuit breaker 38 closes, there is no longer a voltage across the contacts of said breaker and contact C will open as coil 102 no longer has any effect upon the loop 88 of relay 40.

The opening and closing characteristics of circuit breaker 38 are graphically shown in FIGS. 3 and 4. In FIG. 3, the opening characteristics are illustrated, wherein the breaker is tripped on forward current exceeding 150% of the transformer rated current and on reverse current exceeding 125% of the transformer rated current. In FIG. 4, the closing characteristics are illustrated, wherein the transformer secondary circuit breaker 38 will close when the vector sum of the secondary voltage $V_s$ of transformer 10 and the network voltage $V_n$ produces a phasing voltage or voltage $V_p$ across the contacts of circuit breaker 38 that exceeds the magnitude of the closing line 150.

The circuit shown in FIG. 1, therefore, protects and controls the single phase transformer 10, with apparatus much less costly than used in conventional network protectors and at the same time has advantages that the conventional network protector would not have when used in the combination radial-network system previously described.

In addition to requiring a control and protector system for protecting single phase distribution transformers, there is a need for a similar system to control and protect three pase distribution transformers. The requirements of the control and protective system are similar to the system required by single phase transformers, with the additional requirement that when one phase indicates that the secondary breaker should trip, all three poles of the breaker should be opened. The system should protect the transformer from dangerous overloads due to forward current, it should protect the transformer from excessive reverse current flow, and it should automatically reclose the breaker after a trip due to excessive reverse current when the voltages on each side of the circuit breaker contacts are such as to again allow forward current to flow.

A control and protective system for three phase distribution transformers having the above-mentioned requirements is illustrated in FIG. 2. A three phase distribution transformer 200 is shown having, in this instance, a delta connected primary winding 202 and a Y connected secondary winding 204, disposed in an inductive relationship with a suitable magnetic core (not shown). The primary winding 202 is connected through a suitable switch 206 to primary feeder conductors 208, 210 and 212, which may also serve radial loads. The secondary winding 204 is connected through conductors 214, 216 and 218 to secondary circuit breaker 220, which may be electrically operated, and circuit breaker 220 is connected to three phase secondary distribution system conductors 222, 224, and 226. One or more additional three phase distribution transformers, such as the one shown at 228 with its associated secondary circuit breaker 229, may be connected to secondary distribution system conductors 222, 224 and 226, with said additional transformers being served by three phase primary feeder lines which also may serve radial loads. The secondary winding 204 of transformer 200 may be grounded as shown at 230.

The protective and control system for three phase transformer 200 includes control circuit 240, directional relay 242 and two bimetal elements and a current transformer for each of the three phases of transformer 200. In general, the control circuit 240 includes a source of control potential 244 and a control transformer 246, along with closing and tripping solenoid coils 254 and 256, respectively and associated push-buttons. More specifically, control transformer 246 has primary and secondary windings 248 and 250, respectively, disposed in an inductive relationship with magnetic core 252. Primary winding 248 is connected to power source 244 through conductors 262 and 264, and secondary winding 250 is connected to terminals 266 and 268. Closing solenoid coil 254 is connected across terminals 266 and 268 through normally closed trip free contacts 272 and normally open pushbutton 274, or through contacts 275 and 280. Normally open contact 280, which is responsive to relay 242, is connected in series circuit relation with contact 275. Contact 275 opens upon certain conditions, that will be hereinafter explained, to prevent the reclosing of circuit breaker 220 in the event relay 242 causes contact 280 to close. The series circuit of contacts 275 and 280 is connected in parallel circuit relation with, or bridges, push-button 274. Tripping solenoid coil 256 is connected across terminals 266 and 268 through solenoid coil 325 and through trip reset push-button 276. Connected in parallel with, or bridging trip reset push-button 276 are the bimetal devices, as will be hereinafter explained.

Three phase directional relay 242, which may be a Westinghouse type CN33 network relay, or any suitable relay having contacts 326 that will close on reverse current flow, and contacts 280 that will close after the secondary breaker has tripped due to reverse current flow when the circuit conditions are such that if all the breaker contacts are closed, forward current would flow. Solenoid coil 325 and contacts 275 form a protective system that controls when circuit breaker 220 will be allowed to close automatically due to the closing of contacts 280 by action of relay 242. Upon tripping of circuit breaker 220 by action of bimetals 282, 292 or 302, solenoid coil 325 is energized which through a mechanical linkage causes contacts 275 to open. Depressing trip push-button 276 also energizes solenoid coil 325 which causes contacts 275 to open. A mechanical linkage from closing push-button 276 recloses contacts 275 when the circuit breaker 220 is reclosed. Contacts 275 remain closed, even though push-button 274 returns to its normally open position.

In order to make relay 242 and bimetal devices 282 and 284 responsive to the current in line 214, current transformer 281 is disposed in an inductive relationship with said line and connected in a series circuit relationship with said bimetals. Said current transformer and bimetals are connected to relay 242 at terminals 286 and 288. In like manner, current transformer 290 is disposed in inductive relationship with line 216 and connected in a series circuit relation with bimetals 292 and 294 and terminals 296 and 298 of relay 242. Similarly, current transformer 300 is disposed in inductive relationship with line 218 and connected in a series circuit relationship with bimetals 302 and 304 and terminals 306 and 308 of relay 242.

The stationary portion of contacts 310, 312 and 314 of bimetals 282, 292 and 302, are connected in a series circuit relation to terminal 322. The stationary portion of contacts 316, 318 and 320 of bimetals 284, 294 and 304 are connected in a series circuit relation with contact 326, terminal 328 and through solenoid coil 325 to terminal 322. A line from terminal 324 is connected to the midpoints between the bimetals of each phase at terminals 330, 332 and 334.

In order to make relay 242 responsive to the secondary voltage of transformer 200, conductors 340, 342 and 344 are connected from terminals 351, 353 and 355 on line conductors 214, 216 and 218 to terminals 350, 352 and 354 on relay 242.

In order to make relay 242 responsive to the difference between the secondary voltage of transformer 200 and the voltage of conductors 222, 224 and 226 in the secondary distribution system when the secondary circuit breaker 220 is open, lines 360, 362, 364, 366, 368 and 370 are connected from the circuit breaker 220 to relay 242. More specifically, line 360 is connected from terminal 394 on relay 242 to terminal 372 on conductor 340 and then to terminal 351 on line conductor 214; line 362 is connected from terminal 374 on line conductor 214 to terminal 392 on relay 242; line 364 is connected from terminal 378 on line conductor 214 to terminal 390 on relay 242; line 366 is connected from terminal 388 on relay 242 to terminal 376 on line 342 and hence to terminal 353 on line conductor 216; line 368 is connected from terminal 382 on line conductor 218 to terminal 386 on relay 242; and line 370 is connected from terminal 384 on relay 242 to terminal 380 on line 344 and hence to terminal 355 on line conductor 218.

For purposes of describing the operation of the circuit shown in FIG. 2, assume that bimetal elements 282, 292 and 302 have been set to close their respective contacts 310, 312 and 314 when the current through said bimetals reaches 150% of rated phase current and bimetals 284, 294 and 304 have been set to close their respective contacts 316, 318 and 320 when the current through said bimetals reaches 125% of rated phase current.

In the operation of the circuit shown in FIG. 2, switch 206 is closed, connecting transformer 200 to primary feeder conductors 208, 210 and 212, and push-button 274 is momentarily depressed, placing control voltage across closing solenoid coil 254, closing secondary circuit breaker 220 and applying a voltage to secondary distribution conductors 222, 224 and 226. The mechanical action of depressing push-button 274 also closes contacts 275, thus activating the automatic closing circuit of relay 242.

First assume that an overload current is flowing in the forward direction in line conductor 214. When the current reaches 125% of rated phase current, bimetal 284 will close, but since contact 326 is open, there is no effect on the operation of the circuit. However, when the current reaches 150% of the rated phase value, bimetal 282 will close. The closing of contacts 310 of bimetal 282 completes a circuit from terminal 266, to terminal 324, to terminal 330 through contacts 310, through solenoid coil 325, through tripping solenoid 256 to terminal 268. The energization of solenoid coil 325 will cause contact 275 to open and thus deactivate the automatic closing circuit of relay 242. Thus, circuit breaker 220 is tripped when the current reaches the maximum magnitude of forward current that the bimetal 282 is set for and breaker 220 will not automatically reclose by action of relay 242. In like manner, if the overload of forward current occurs in line conductor 216, bimetal 294 will close its contacts 318 when 125% of rated current is reached, but this has no effect since contact 326 is open. When the overload reaches 150% of rated phase current, bimetal 292 closes its contacts 312 and control voltage is placed across tripping solenoid 256 through the circuit from terminal 266, to terminal 324, to terminal 332, through contacts 312, through solenoid 325, through tripping solenoid 256 and back to control transformer winding 250 at terminal 268. Similarly, if the overload occurs in line conductor 218, bimetal 304 will close its contacts 320 when 125% of rated phase current is reached, but this has no effect since contact 326 is open. When the overload reaches 150% of rated phase current, bimetal 302 closes its contacts 314 and control voltage is placed across tripping solenoid 256 through the circuit from terminal 266 to terminal 324, to terminal 334, through contact 314, through solenoid 325 and through tripping solenoid 256 to terminal 268 and back to terminal 266 through control transformer winding 250. Therefore, an overload of forward current in any of the line conductors 214, 216 or 218 will trip secondary breaker 220 when the pre-set value of maximum forward current is reached, and will deactivate the automatic closing circuit of relay 242 so that breaker 220 will not automatically reclose.

Upon the occurrence of a condition on primary feeder lines 208, 210 and 212 which causes the voltage to drop, transformer 228 and any other transformer connected to line conductors 222, 224 and 226 will feed energy back through transformer 200 to conductors 208, 210 and 212 and attempt to pick up any loads served by said conductors. Therefore, the current through line conductors 214, 216 and 218 has reversed, according to the hereinbefore stated definition, and this is sensed by current transformers 281, 290 and 300, and relay 242 causes its contacts 326 to close. If the reverse current reaches the magnitude preset on any one of the bimetals 284, 294 or 304, which we have assumed in this instance to be 125% of the transformer rated phase current, the bimetal in the circuit sustaining the overload will close its contacts, and since contact 326 of relay 242 is closed, a circuit is completed for the control voltage to energize tripping solenoid 256, opening secondary circuit breaker 220.

More specifically, if the reverse current reaches 125% of the rated phase current of transformer 200 in line 214, bimetal 284 will close its contacts 316, completing the circuit from terminal 266, to terminal 324, to terminal 330, through bimetal contacts 316, through contacts 326, through tripping solenoid 256, to terminal 268 and through control transformer winding 250 back to terminal 266.

Similarly, if the reverse current reaches 125% of the rated current in line 216, bimetal 294 will close its contacts 318, completing the circuit from terminal 266, to terminal 324, to terminal 332, through bimetal contacts 318, through contact 326, through tripping solenoid 256, to terminal 268 and through control transformer winding 250 back to terminal 266.

Similarly, if the reverse current reaches 125% of the rated current in line 218, bimetal 304 will close its contacts 320, completing the circuit from terminal 266, to terminal 324, to terminal 334, through bimetal contacts 320, through contact 326, through tripping solenoid 256, to terminal 268 and through control transformer winding 250 back to terminal 266.

Therefore, an overload of reverse current or energy away from the load of transformer 200 in any of the line conductors 214, 216, or 218 will trip secondary breaker 220 when the preset value of maximum reverse current is reached. Contact 275 will remain closed, thus permitting the automatic closing circuit of relay 242 to remain activated.

When the circuit breaker 220 has tripped due to an excessive reverse current flow through transformer 200, the relay 242 will automatically reclose secondary circuit breaker 220 when the relationship of the secondary voltage of transformer 200 to the distribution network voltage is such that forward current will again flow from transformer 200 to the conductors 222, 224 and 226. This is graphically shown in FIG. 4, and has been hereinbefore described. More specifically, when the voltage relationship in each of the line conductors 214, 216 and 218 is such that forward current will flow through these conductors, relay 242 will close its contact 280, thus energizing closing solenoid 254, since contact 275 is closed, and reclosing secondary breaker 220. Therefore, the protective and control circuit shown in FIG. 2 will automatically restore transformer 200 to service when the circuit conditions that caused reverse current in line conductors 214, 216 and 218 which in turn caused transformer secondary circuit breaker 220 to trip have been corrected.

The tripping and closing characteristics of the circuit illustrated in FIG. 2 are the same as those for FIG. 1, as graphically illustrated in FIGS. 3 and 4 and hereinbefore described.

It will, therefore, be apparent that there has been disclosed a new and improved protective and control system for electrical inductive apparatus. The system disclosed is uncomplicated and requires relatively inexpensive components, because extreme reverse current sensitivity is not only not required, but is undesirable. The system disclosed provides transformer protection against damage due to excessive forward current and reverse current. Further, the transformer is automatically placed in service after a reverse current trip when the transformer secondary and network voltages are such that forward current will again flow. Further, the teachings of this invention may be utilized on either single phase or multi-phase distribution systems.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. In a protective and control system for electrical apparatus having at least two output conductors, the combination comprising first and second means responsive to the magnitude of current in said output conductors, said first and second means each having contacts that close when said current reaches preset magnitudes, third means responsive to the direction of energy flow in said output conductors, said third means having contacts that open when energy is flowing in one direction and close when energy is flowing in the reverse direction, fourth means responsive to the difference between the potential of said electrical apparatus and the potential of an electrical circuit to which said electrical apparatus is to supply energy, said fourth means having contacts that close when said potential difference would cause energy to flow in one direction in said output conductors and open when the potential difference would cause said energy to flow in the reverse direction, and fifth means providing a control voltage, the contacts of said first means being connected in circuit relation with said fifth means and causing a circuit interrupting device to open an electrical circuit when the contacts of said first means close, the contacts of said second means being connected in circuit relation with said fifth means and the contacts of said third means and causing a circuit interrupting device to open an electrical circuit when the contacts of said second and third means close, the contacts of said fourth means being connected in circuit relation with said fifth means and causing a circuit interrupting device to complete an electrical circuit when the contacts of said fourth means close.

2. In a protective and control system for electrical apparatus having at least two output conductors, the combination comprising first means having contacts connected in circuit relation with said output conductors, second means for closing the contacts of said first means, third means for opening the contacts of said first means, fourth and fifth means responsive to the magnitude of the current in said output conductors, said fourth and fifth means each having contacts that close when said current reaches preset magnitudes, sixth means responsive to the direction of energy flow in said output conductors, said sixth means having contacts that are open when energy is flowing in one direction and closed when the energy is flowing in the reverse direction, seventh means responsive to the electrical potential across the contacts of said first means, said seventh means having contacts that are closed when the electrical potential would cause energy to flow in one direction in said output conductors and open when the electric potential would cause said energy to flow in the reverse direction, and eighth means providing a control voltage, the contacts of said fourth means being connected in circuit relationship with said third and eighth means, the contacts of said first means opening when the contacts of said fourth means close, the contacts of said fifth means being connected in circuit relationship with said third and eighth means and the contacts of said sixth means, the contacts of said first means opening when the contacts of said fifth and sixth means are closed, the contacts of said seventh means being connected in circuit relationship with said second and eighth means, the contacts of said first means closing when the contacts of said seventh means close.

3. In a protective and control system for electrical inductive apparatus having at least two output conductors, the combination comprising first means comprising a circuit interrupting device connected between said output conductors and an electrical circuit, second means electrically controlling the closing of said first means, third means electrically controlling the opening of said first means, fourth and fifth means responsive to the current flow in the output conductors of said inductive apparatus, said fourth and fifth means each having contacts that close when said current reaches preset magnitudes, sixth means comprising a source of control voltage, and relay means having a first and second set of contacts, said relay means being responsive to the direction of energy flow between said inductive apparatus and said electrical circuit such that said first set of contacts is open when the energy flows from the inductive apparatus to the electrical circuit and closed when the energy flows in the reverse direction, said relay means being responsive to the voltage difference between said inductive apparatus and said electrical circuit when said first means is open such that said second set of contacts is closed when energy would flow from the inductive apparatus to the electrical circuit and open when said energy would flow in the reverse direction, the contacts of said fourth means being connected in circuit relation with said third and sixth means and opening said first means when the contacts of said fourth means close, the contacts of said fifth means being connected in circuit relation with said third and sixth means and the first set of contacts of said relay means and opening said first means when the contacts of said fifth means and the first set of contacts of said relay means are closed, the second set of contacts of said relay means being connected in circuit relation with said sixth means and said second means and closing said first means when said second set of contacts of said relay means close.

4. In a protective and control system for a transformer having primary and secondary windings the combination comprising a circuit breaker connected between the secondary winding of said transformer and an electrical circuit, said circuit breaker having electrically operated opening means, said circuit breaker having electrically operated closing means, first and second means responsive to the magnitude of current flow between said transformer secondary winding and said electrical circuit, said first and second means each having contacts that close when said current reaches preset magnitudes, third means comprising a source of control voltage, and relay means having a first and second set of contacts, said relay means being responsive to the direction of electrical energy flow between the secondary winding of said transformer and said electrical circuit such that said first set of contacts is open when the electrical energy flows from said transformer to said electrical circuit and closed when the electrical energy flows in the reverse direction, said relay means being responsive to the voltage difference between the secondary winding of said transformer and said electrical circuit when said circuit breaker is open such that said second set of contacts is closed when electrical energy flows from the secondary winding of said transformer to the electrical circuit and open when said electrical energy flows in the reverse direction, the contacts of said first means being connected in circuit relation with said third means and the electrically operated opening means of said circuit breaker, said circuit breaker opening when the contacts of said first means close, the contacts of said second means being connected in circuit relation with said third means, the first set of contacts of said relay means and the electrically operated opening means of said circuit breaker, said circuit breaker opening when the contacts of said second means and the first set of contacts of said relay means are closed, the second set of contacts of said relay means being connected in circuit relation with said third means and the electrically operated closing means of said circuit breaker, said circuit breaker closing when the second set of contacts of said relay means close.

5. In a protective and control system for a transformer having primary and secondary windings, the combination comprising a circuit breaker having electrically operated closing and tripping means and connected between the secondary winding of said transformer and an electrical circuit, a directional relay having first and second sets of contacts, said directional relay being responsive to the direction of electrical energy flow between the secondary winding of said transformer and said electrical circuit such that said first set of contacts is open when the energy flows from said secondary winding to said electrical circuit and closed when said electrical energy is in the reverse direction, said directional relay being responsive to the difference between the potential of the secondary winding of said transformer and the potential of said electrical circuit when said circuit breaker is open such that said second set of contacts is closed when said potential difference would cause electrical energy to flow from the secondary winding of said transformer to said electrical circuit and open when said potential difference would cause electrical energy to flow in the reverse direction, first and second bimetal devices responsive to the electrical energy flowing between said secondary winding and said electrical circuit, each of said bimetal devices having contacts that close when a preset magnitude of electrical energy is reached, and a source of control potentials, the contacts of said first bimetal device being connected in circuit relation with said control potential and the electrically operated tripping means of said circuit breaker, said second bimetal devices being connected in circuit relation with said control potential, the electrically operated tripping means of said circuit breaker and the first set of contacts of said directional relay, the second set of contacts of said directional relay being connected in circuit relation with said control potential and the electrically operated closing means of said circuit breaker.

6. In a protective and control system for a transformer having primary and secondary windings, the combination comprising a circuit breaker having electrically operated closing and tripping means, said circuit breaker being connected between the secondary winding of said transformer and an electrical circuit, a watt transducer connected in circuit relation with said transformer and electrical circuit, said watt transducer controlling first and second sets of contacts, the first set of contacts of said watt transducer closing when the direction of the flow of electrical energy between the secondary winding of said transformer and said electrical circuit is towards said secondary winding and opening when said electrical energy flows towards said electrical circuit, the second set of contacts of said watt transducer closing when the potential difference between the secondary winding of said transformer and said electrical circuit when said circuit breaker is open would cause electrical energy to flow towards said electrical circuit, and opening when said current would flow towards said secondary winding, current transformer means producing a signal proportional to the magnitude and direction of the flow of electrical energy between said secondary winding and said electrical circuit, first and second bimetal elements connected in circuit relation with said current transformer and said watt transducer, said first and second bimetal elements each having contacts that close when the electrical energy flowing through said first and second bimetal elements reaches preset magnitudes, said first bimetal element being set to close its contacts at a higher magnitude of electrical energy than said second bimetal, and a source of control voltage, the contacts of said first bimetal element being connected in circuit relation with said control voltage and the tripping means for said circuit breaker, said circuit breaker tripping when the magnitude of electrical energy flow reaches the preset value of said first bimetal element, the contacts of said second bimetal element being connected in circuit relation with said control voltage, the tripping means for said circuit breaker, and the first set of contacts of said watt transducer, said circuit breaker tripping when the magnitude of electrical energy flow reaches the preset value of said second bimetal element and the first set of contacts of said watt transducer are closed, the second set of contacts of said watt transducer being connected in circuit relation with said control voltage and the closing means of said circuit breaker, said circuit breaker closing when the second set of contacts of said watt transducer closes.

7. In a protective and control system for a single phase transformer having primary and secondary windings, the combination comprising a circuit breaker having electrically operated closing and tripping means, said circuit breaker being connected between the secondary winding of said transformer and an electrical circuit, a Hall generator connected in circuit relation with said transformer and said electrical circuit, said Hall generator controlling first and second sets of contacts, the first set of contacts of said Hall generator closing when the direction of electrical energy flow between the secondary winding of said transformer and said electrical circuit is towards said secondary winding and opening when the electrical energy flows towards said electrical circuit, the second set of contacts of said Hall generator closing when the potential difference between the secondary winding of said transformer and said electrical circuit when said circuit breaker is open would cause electrical energy to flow toward said electrical circuit, and opening when the electrical energy would flow toward said secondary winding, current transformer means producing a signal proportional to the magnitude of the current and direction of the energy flow between the secondary winding of said transformer and said electrical circuit, first and second bimetal elements connected in circuit relation with said current transformer means and said Hall generator, said first and second bimetal elements each having contacts that close when the current through said first and second bimetal elements reaches preset magnitudes, said first bimetal element being set to close its contacts at a higher current magnitude than said second bimetal element, and a source of control voltage, the contacts of said first bimetal element being connected in circuit relation with said control voltage and the tripping means for said circuit breaker, said circuit breaker tripping when the current magnitude reaches the preset value of said first bimetal element, the contacts of said second bimetal element being connected in circuit relation with said control voltage, said tripping means for said circuit breaker, and the first set of contacts of said Hall generator, said circuit breaker tripping when the current magnitude reaches the preset value of said second bimetal element and the first set of contacts of said Hall generator are closed, the second set of contacts of said Hall generator being connected in circuit relation with said control voltage and the closing means of said circuit breaker, said circuit breaker closing when the second set of contacts of said Hall generator close.

8. In a protective and control system for a multiphase transformer having primary and secondary windings, the combination comprising a circuit breaker having electrically operated closing and tripping means, said circuit breaker being connected between the secondary winding of said transformer and an electrical circuit, a multiphase directional relay connected in circuit relation with said transformer and electrical circuit and having first and second sets of contacts, the first set of contacts of said directional relay closing when the flow of electrical energy between any phase of the secondary winding of said transformer and said electrical circuit is towards said secondary winding and opening when the energy flow is towards said electrical circuit, the second set of contacts of said directional relay closing when the potential difference between any phase of the secondary winding of said transformer and said electrical circuit when said circuit breaker is open would cause electrical energy to flow towards said electrical circuit and opening when the electrical energy would flow towards said secondary winding, current transformer means producing signals proportional to the magnitude of the current flow between each phase of said secondary winding and said electrical circuit, first and second bimetal elements connected in circuit relationship with each current transformer and said directional relay, said first and second bimetal elements each having contacts that close when the current through said first and second bimetal elements reaches preset magnitudes, said first bimetal element being set to close its contacts at a higher current magnitude than said second bimetal element, and a source of control voltage, the contacts of said first bimetal elements being connected in circuit relation with said control voltage and the tripping means for said circuit breaker such that closing the contacts of any of said first bimetal elements will cause said circuit breaker to open, the contacts of said second bimetal elements being connected in circuit relation with said control voltage, the tripping means for said circuit breaker, and the first set of contacts of said directional relay such that closing the contacts of any of said second bimetal elements will cause said circuit breaker to open when the first set of contacts of said directional relay are closed, the second set of contacts of said directional relay being connected in circuit relation with said control voltage and the closing means of said circuit breaker, said circuit breaker closing when the second set of contacts of said directional relay close.

9. A protective and control system for electrical apparatus having at least two output conductors, comprising first and second means responsive to the magnitude of current in said output conductors, said first and second means each having contacts that close when said current reaches preset magnitudes, third means responsive to the direction of electrical energy flow in said output conductors, said third means having contacts that open when electrical energy is flowing in one direction and close when electrical energy is flowing in the reverse direction, and fourth means providing a control voltage, the contacts of said first means being connected in circuit relation with said fourth means and causing a circuit interrupting device to open an electrical circuit when the contacts of said first means close, the contacts of said second means being connected in circuit relation with said fourth means and the contacts of said third means and causing a circuit interrupting device to open an electrical circuit when the contacts of said second and third means close.

10. A protective and control system for electrical apparatus having at least two output conductors, comprising first means having contacts connected in series circuit relation with said output conductors, second means for opening the contacts of said first means, third and fourth means responsive to the magnitude of the current in said output conductors, said third and fourth means each having contacts that close when said current reaches preset magnitudes, fifth means responsive to the direction of electrical energy flow in said output conductors, said fifth means having contacts that are open when electrical energy is flowing in one direction and closed when electrical energy is flowing in the reverse direction, sixth means providing a control voltage, the contacts of said third means being connected in circuit relation with said second and sixth means, the contacts of said first means opening when the contacts of said third means close, the contacts of said fourth means being connected in circuit relation with said second and sixth means and the contacts of said fifth means, the contacts of said first means opening when the contacts of said fourth and fifth means are closed.

11. A protective and control system for a transformer having primary and secondary windings comprising, an electrically operated circuit breaker connected between the secondary winding of said transformer and an electrical circuit, said electrically operated circuit breaker including an opening coil, a directional relay having contacts, said directional relay being responsive to the direction of electrical energy flow between said secondary winding and said electrical circuit such that said contacts are open when the energy flows from said secondary winding to said electrical circuit and closed when said energy flow is in the reverse direction, first and second bimetal devices responsive to the current flowing between said secondary winding and said electrical circuit, each of said bimetal devices having contacts that close when preset magnitudes of current are reached, and a source of control potential connected in circuit relation with said transformer, the contacts of said first bimetal device being connected in circuit relation with said control potential and the opening coil on said electrically operated circuit breaker, the contacts of said second bimetal device being connected in circuit relation with said control potential, the opening coil on said electrically operated circuit breaker and the contacts on said directional relay.

References Cited by the Examiner

UNITED STATES PATENTS 2,313,942  3/1943  Johnson _____ 317—23
2,909,708  10/1959  Glassburn _____ 317—23

MILTON O. HIRSHFIELD, *Primary Examiner.*

J. D. TRAMMELL, *Assistant Examiner.*